United States Patent
Wojewnik et al.

[11] Patent Number: 6,036,501
[45] Date of Patent: Mar. 14, 2000

[54] TRIM PANEL WITH INTEGRALLY FORMED ELECTRICAL CONNECTORS

[75] Inventors: Albert Wojewnik, Royal Oak; Ronald K. Reich, Saline, both of Mich.

[73] Assignee: Lear Automotive Dearborn, Inc., Southfield, Mich.

[21] Appl. No.: 09/129,741

[22] Filed: Aug. 5, 1998

[51] Int. Cl.[7] .................................................. H01R 23/66
[52] U.S. Cl. ............................................ 439/34; 439/931
[58] Field of Search ...................................... 439/931, 34

[56] References Cited

U.S. PATENT DOCUMENTS

| | | |
|---|---|---|
| 3,424,658 | 1/1969 | Norton . |
| 4,031,268 | 6/1977 | Fairbairn . |
| 4,556,628 | 12/1985 | Greschner et al. . |
| 4,800,648 | 1/1989 | Nakayama et al. . |
| 4,818,236 | 4/1989 | Nakayama et al. . |
| 4,824,164 | 4/1989 | Nakayama et al. . |
| 4,848,829 | 7/1989 | Kidd . |
| 4,869,670 | 9/1989 | Ueda et al. . |
| 5,460,530 | 10/1995 | Toba et al. . |
| 5,735,041 | 4/1998 | Zaguskin et al. . |

FOREIGN PATENT DOCUMENTS

| | | |
|---|---|---|
| 563359 | 9/1958 | Canada . |
| 0130844 | 1/1985 | European Pat. Off. . |
| 5697814 | of 0000 | Japan . |
| 5984621 | of 0000 | Japan . |
| 59-114720 | 8/1984 | Japan . |
| 1413518 | 11/1972 | United Kingdom . |
| 2014368 | 8/1979 | United Kingdom . |
| 2164609 | 8/1985 | United Kingdom . |
| 2166603 | 9/1985 | United Kingdom . |

*Primary Examiner*—Gary F. Paumen
*Assistant Examiner*—Truc Nguyen
*Attorney, Agent, or Firm*—MacMillan, Sobanski & Todd, LLC

[57] ABSTRACT

A vehicle trim panel assembly includes a trim panel of electrically non-conductive material that has an interior and an exterior surface. The exterior surface includes decorative trim mounted on it such as vinyl, leather, or cloth, for example, which makes that exposed surface visually appealing. An electrical circuit is deposited upon and adhered to the interior surface. First and second electrical connectors project from the electrical circuit. The connectors are formed as an integral part of the trim panel with the circuit material. Electrical components then may be attached to the first and second connectors. A vehicle wire harness is attached to the first connector while components such as a window regulator and rear view mirror control are attached to any number of second connectors.

10 Claims, 3 Drawing Sheets

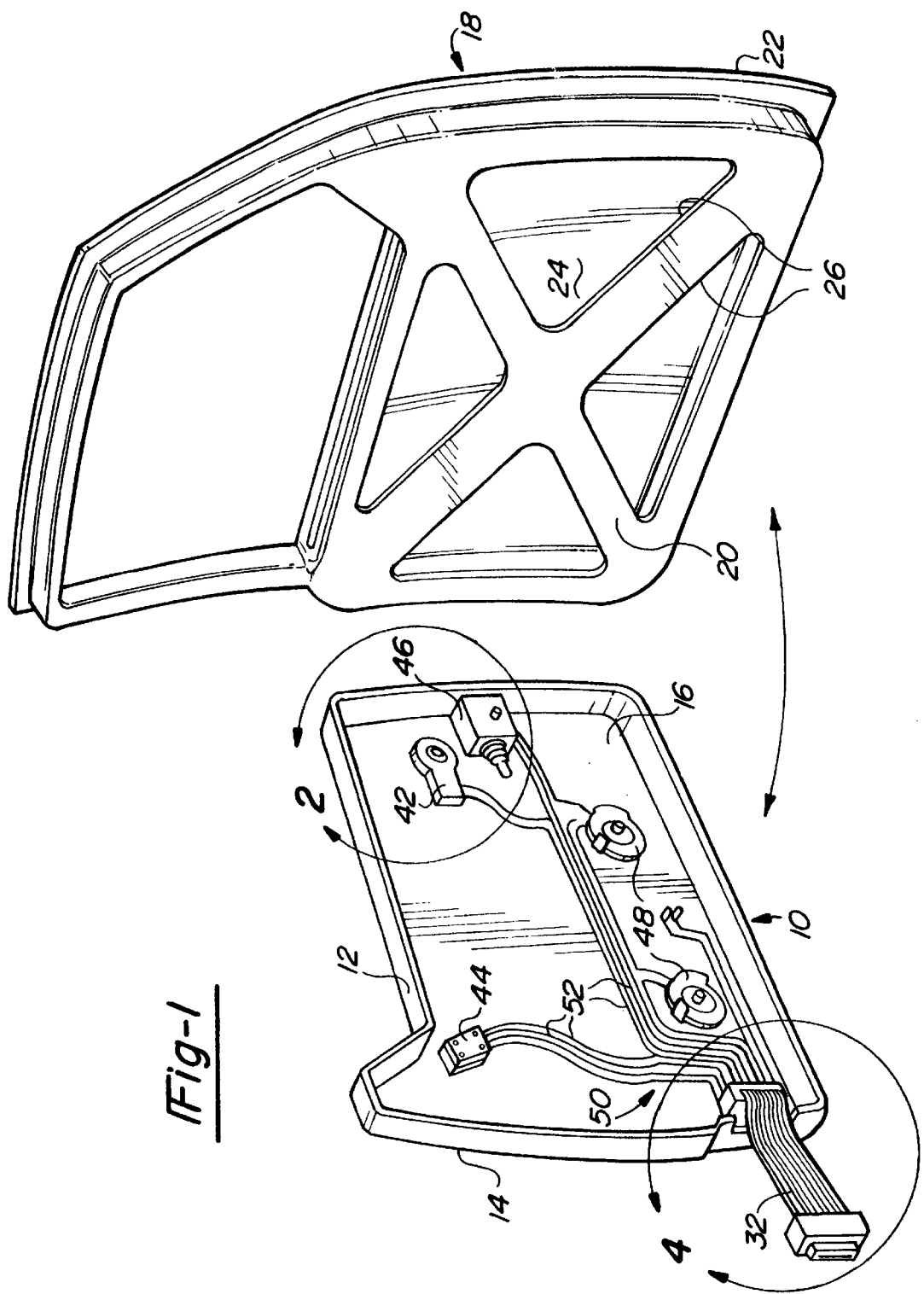

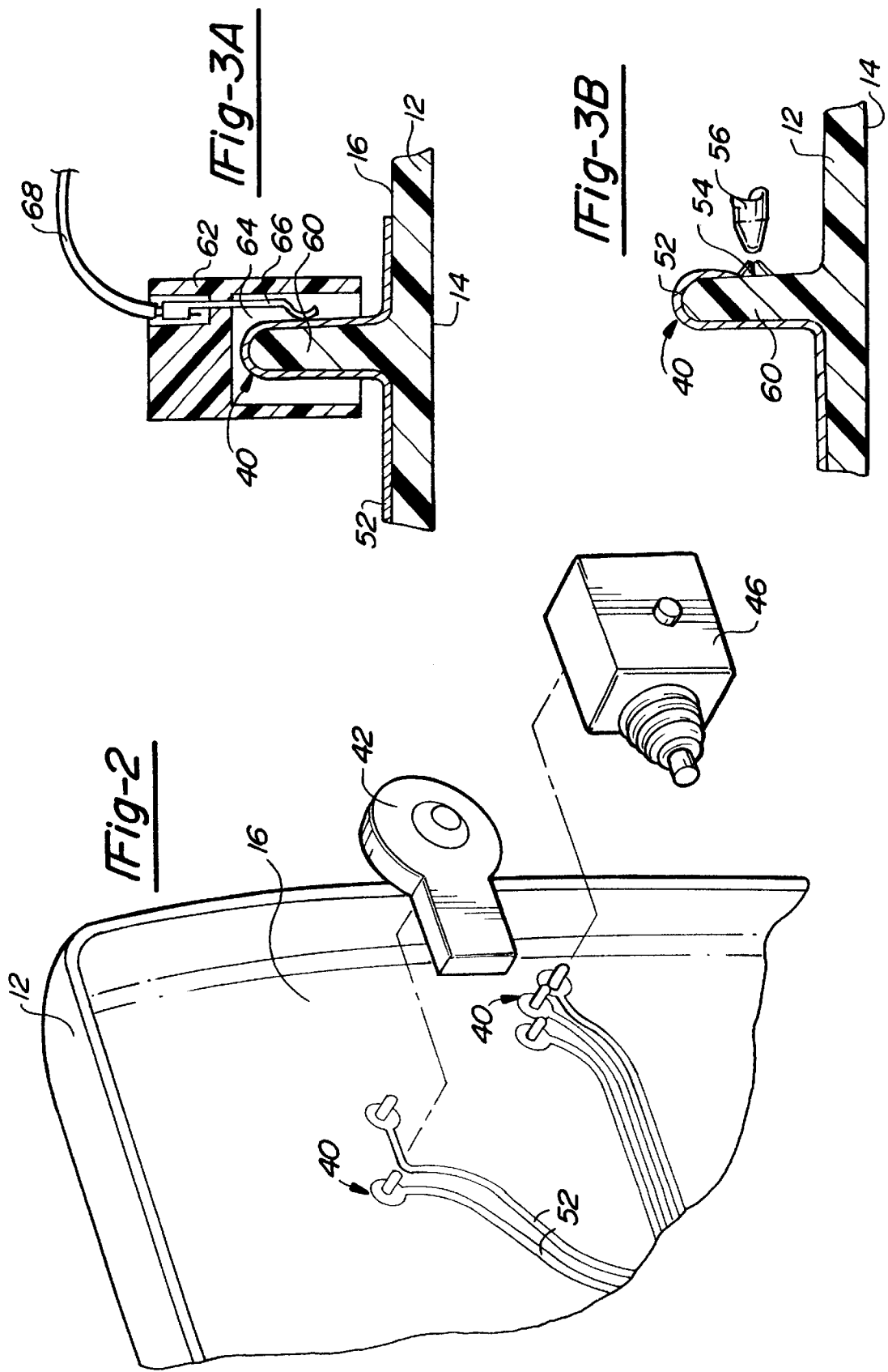

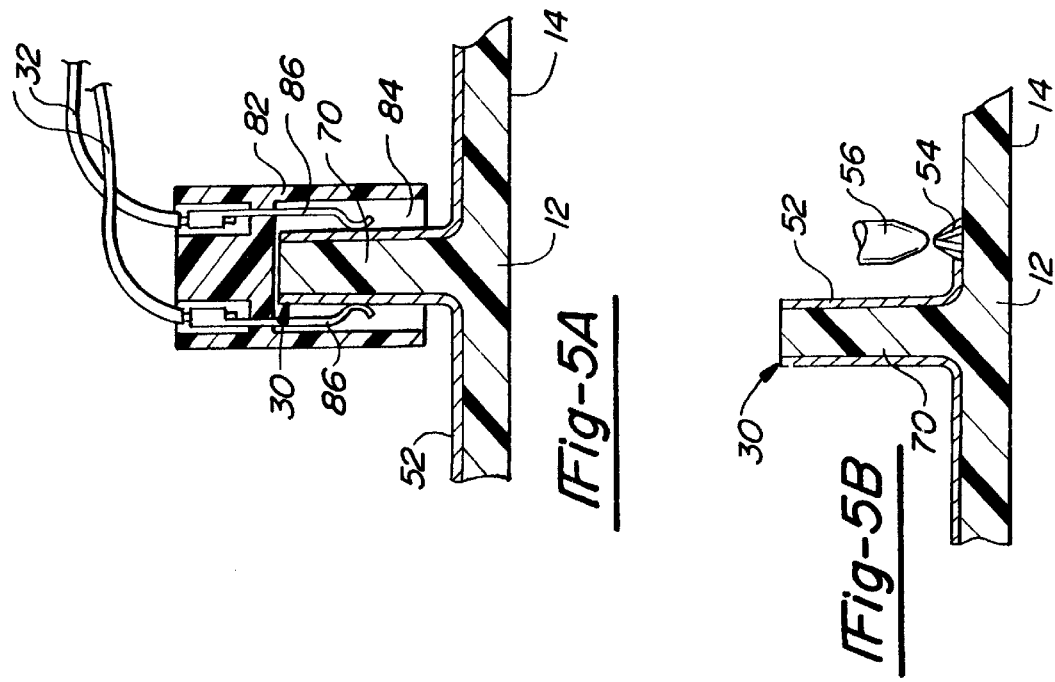
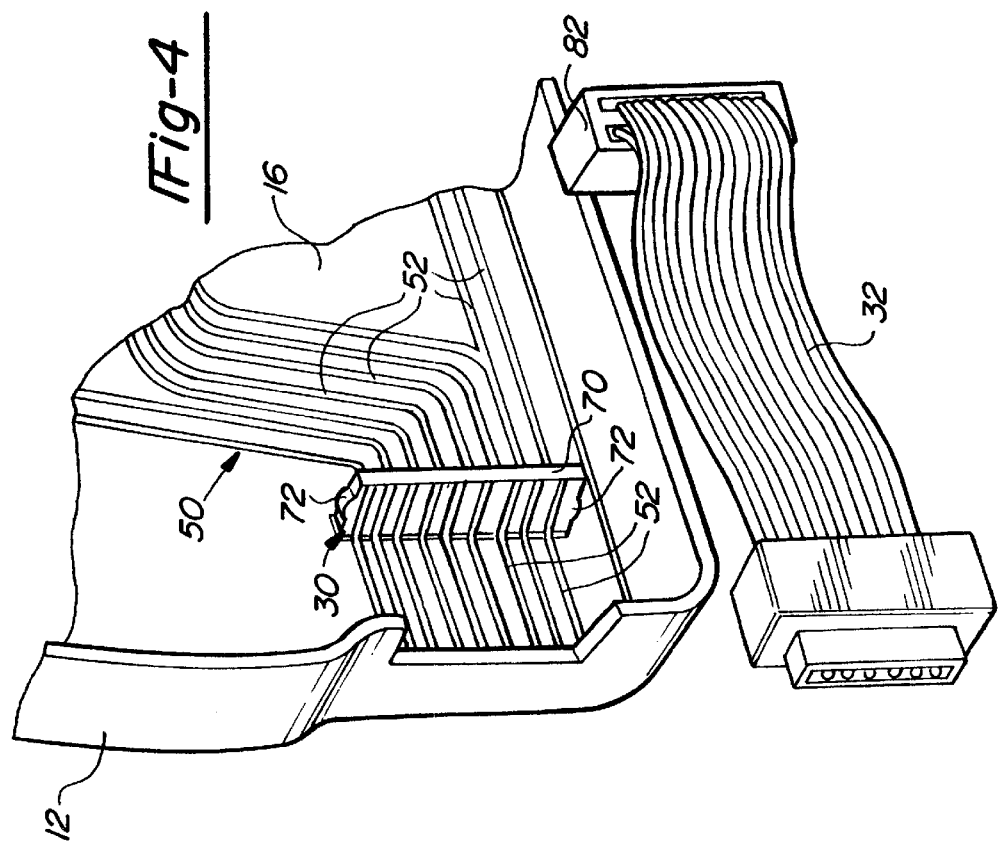

TRIM PANEL WITH INTEGRALLY FORMED ELECTRICAL CONNECTORS

BACKGROUND OF THE INVENTION

This invention relates to a vehicle trim panel assembly having an integrally molded electrical circuit with a number of integrally molded electrical connectors.

Vehicles have trim panels mounted to interior surfaces of the body to present a pleasing appearance. As an example, door trim panels are mounted to the interior surface of a door assembly. Typically, vehicle door assemblies include spaced apart inner and outer panels defining a cavity for mounting a window, window regulator, speakers and other mechanical and electrical devices. These devices are installed inside the door cavity through a plurality of access openings provided in the door inner panel.

A door trim panel conceals this interior surface of the door, and is conventionally formed of a rigid panel, such as molded plastic or pressed hardboard. The exterior of the trim panel, which faces the vehicle occupant, is covered with a flexible decorative trim material such as cloth, vinyl, leather and/or carpeting, thereby creating a pleasing appearance to the occupant. The door trim panel is secured to the door by suitable fasteners.

The door trim panel also often supports a number of electrical components. The components may include lights, window controls, rear view mirror controls, door lock controls, seat adjustment controls, and speakers. Each of these electrical components requires an individual wiring connector power supply lead wires and perhaps control wires. The wires are typically bundled together to create what is commonly called a wire harness. The wire harness is fixed to the trim panel or to the door to hold the wire harness. The wire harness is connected to a main wire harness that enters the door cavity near the hinged end of the door. As can be appreciated, the mounting and wiring of these electrical components is labor intensive and requires a number of connectors and other electrical parts.

Solutions to this problem have been contemplated by the prior art. Specifically, it has been proposed that the wires be mounted, molded, etched, printed, or otherwise affixed to a separate rigid board material. The rigid board is in turn mounted to either the trim panel or the door or both. Hence, in these proposals, the door assembly includes the door itself, a rigid board, and the trim panel. These proposals, however, have a number of deficiencies. One deficiency is the same as with the loose bundle of wires, that is, a significant amount of intensive manual labor is required to mount the wires to the board, mount the connectors to the board, and then mount the board itself to either the trim panel or the door. Further, additional connectors must be mounted on the board to electrically connect the connectors from the door to the connectors on the trim panel.

Copending applications Ser. No. 09/053,395 entitled "Trim Panel with Integrally Formed Electrical Circuits" and filed Apr. 1, 1998, and Ser. No. 09/085,986 entitled "Trim Panel Having Grooves with Integrally Formed Electrical Circuits" and filed May 27, 1998, disclose a method of forming the circuits on the trim panel. With the methods disclosed in their applications there is a need to improve the formation of the electrical connectors.

SUMMARY OF THE INVENTION

The present invention provides a vehicle trim panel assembly that includes a trim panel of electrically non-conductive material that has an interior and an exterior surface. The exterior surface includes decorative trim mounted on it such as vinyl, leather, or cloth, for example, which makes that exposed surface visually appealing. Electrical circuit traces are deposited upon and adhered to the interior surface using a thermal spray process. First and second electrical connectors project from and are in electrical communication with the circuit traces. The connectors are formed as an integral part of the trim panel with the circuit material. Said another way, the raised projections are molded with the trim panel and the electrically conductive circuit material is deposited on the projections in the course of forming the electrical circuit with the thermal sprayer. Electrical components then may be attached to the first and second connectors. A vehicle wire harness is attached to the first connector while components such as a window regulator and rear view mirror control are attached to any number of second connectors.

The invention thus provides a vehicle trim panel having an integrally molded electrical circuit integrally molded with electrical connectors for interconnecting a number of electrical devices. The trim panel of the subject invention can be efficiently manufactured and may not require any additional components or connectors. In other words, all of the parts necessary to electrically connect an electrically operated component to an electrical supply are included within the trim panel itself. These parts include the connectors and the electrical circuit which are all preferably integrally molded into the trim panel.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a trim panel assembly in spaced relationship to a vehicle door assembly;

FIG. 2 is an exploded perspective view from area 2 of FIG. 1;

FIG. 3A is a cross-sectional view of an electrical connector of FIG. 2;

FIG. 3B is a view similar to FIG. 3A schematically showing electrically conductive material being deposited on the electrical connector by a thermal spray process;

FIG. 4 is an exploded perspective view from area 4 of FIG. 1;

FIG. 5A is a cross-sectional view of an electrical connector of FIG. 4; and

FIG. 5B is a view similar to FIG. 5A schematically showing electrically conductive material being deposited on the electrical connector by a thermal spray process.

DETAILED DESCRIPTION OF THE PREFERRED EMBODIMENT

Vehicle trim panel assembly 10 as shown in FIG. 1 includes trim panel 12 constructed of electrically non-conductive material having an exterior surface 14 and an interior surface 16. Trim panel 12 is shown as an automotive door trim panel which mounts to a vehicle door assembly, generally shown at 18. However, the trim panel of the subject invention may be any type of trim panel associated with a vehicle without deviating from the scope of the subject invention. Other types of trim panels include trunk panels, quarter panels, rear package trays, headliners, instrument panels, garnish moldings, console panels, etc.

The vehicle door assembly 18 includes spaced apart inner 20 and outer 22 metal panels defining a cavity 24 for receiving a window, window regulator, speakers, and other electrical devices (not shown). A plurality of access openings 26 are provided in the inner panel 20 to allow access into the cavity 24 of the door assembly 18. The door trim panel 12 is utilized to conceal this interior surface 20 of the vehicle door 18.

Door trim panel 12 is preferably formed of a molded plastic such as polypropylene. As appreciated by those skilled in the art, the trim panel 12 may alternatively be fabricated of wood fibers, polyurethane, solid molded vinyl, expanded polyurethane foam, any combination thereof or any other suitable rigid electrically non-conductive material. The exterior surface 14 of the trim panel 12 may include a decorative surface. Specifically, the trim panel 12 may be covered with a flexible decorative trim material such as cloth, vinyl, leather, and/or carpeting. The trim panel 12 is attached to the vehicle door 18 by suitable fasteners as are well known in the art.

The interior surface 16 of the trim panel 12 includes a first electrical connector 30 and a second electrical connector 40, as best shown in FIGS. 4 and 2, respectively. The first electrical connector 30 is adapted to receive the wire harness 32 extending into the cavity 24 near the hinged end of the door. As shown in FIG. 2, there are a number of second electrical connectors 40. Returning to FIG. 1, the interior surface of the trim panel also supports a number of electrical components. These components can include window controls 42, rear view mirror controls 44, door lock controls 46, speakers 48, etc. Each of these electrical components 42,44, 46,48 has an associated set of second electrical connectors 40.

An electrical circuit, generally shown at 50, is integrally deposited on and adhered to the interior surface 16 of the trim panel 12 for electrically connecting the first electrical connector 30 to the plurality of second electrical connectors 40. The method of depositing the electrical circuit 50 may be accomplished by flame spraying molten metal particles or any other suitable means as disclosed in copending applications Ser. No. 09/053,395 entitled "Trim Panel with Integrally Formed Electrical Circuits" and filed Apr. 1, 1998, or Ser. No. 09/085,986 entitled "Trim Panel Having Grooves with Integrally Formed Electrical Circuits" and filed May 27, 1998. The teachings of those two applications are incorporated by reference into this specification. The electrical circuit 50 formed within the trim panel 12 comprises a plurality of spaced apart circuit traces 52 or strips of conductive material.

As appreciated by those skilled in the art, most electrical components require at least two input supply wires, i.e., a ground wire and an input wire carrying an electrical current. Further, if the electrical component is a switch, there will be at least one output wire also carrying an electrical current. Hence, the number of traces 52 formed in the electrical circuit 50 will depend on the number and type of electrical components used. Each individual trace 52 can vary in width and thickness to accommodate varied gauges and to customize resistivity.

As discussed above, the trim panel 12 is mounted to the inner panel 20 of the vehicle door assembly 18. To prevent a short circuit the electrical circuit 50 of the trim panel 12 is preferably spaced some distance from the door assembly 18. Further, an insulative coating (not shown) or similar material may be applied over the electrical circuit 50 to create a protective moisture barrier between the door assembly 18 and the trim panel 12.

Referring to FIGS. 2 through 5B, the first 30 (FIG. 4) and second 40 (FIG. 2) electrical connectors will be discussed in greater detail. The first 30 and second 40 electrical connectors project away from the inner surface 16 of the trim panel 12 at an angle wherein the first 30 and second 40 electrical connectors may be mated with an electrical component 32,42,44,46,48. Preferably, the first 30 and second 40 electrical connectors project away from the inner surface 16 at a substantially perpendicular angle. However, it is to be understood that the connectors 30,40 may project from the inner surface 16 in any manner that permits the electrical components 32,42,44,46,48 to be attached to the first 30 and second 40 electrical connectors.

Referring to FIGS. 2 and 3A, the second electrical connector 40 is shown in greater detail. Specifically, the second electrical connector 40 comprises at least one outwardly projecting pin 60 that is formed integrally with the trim panel during molding. The circuit traces 52 extend entirely over the pin 60 thereby forming a male connector. The traces 52 are formed in accordance with the methods disclosed in the above mentioned copending applications. That is, the electrically conductive material 54 is deposited on the trim panel 12 using a thermal spray process schematically shown at 56 which creates the traces 52 that overlap the pin 60, as shown in FIG. 3B. However, the trace 52 need not completely cover the pin 60 so long as there is a sufficient surface for the electrical component 42,44,46,48 to electrically attach.

In a preferred embodiment electrical components 42,44, 46,48 include at least one housing 62 having an internal cavity 64 for receiving the second electrical connector 40. As shown, housing 62 may include at least one terminal 66 for frictionally engaging the second electrical connector 40 and providing an electrical connection between the traces 52 and the electrical component 42,44,46,48. The terminal 66 is constructed of a resilient conductive material that securely retains the housing 62 to the connector 40. The housing 62 may be formed integrally with the electrical component 42,44,46,48 or alternatively may be separate from the electrical component 42,44,46,48 but electrically attached by lead wires 68, as shown in FIG. 3A. If lead wires 68 are used, it may be necessary for the interior surface 16 to include additional structure (not shown) to support the electrical components 42,44,46,48. However, if the housing 62 is integrally formed with the electrical component 42,44, 46,48, the electrical component 42,44,46,48 may be supported on the interior surface 16 by the second connectors 40.

Referring to FIGS. 4 and 5A, the first electrical connector 30 is shown in greater detail. Specifically, the first electrical connector 30 comprises an outwardly projecting thin flat rib 70. The flat rib 70 further includes a locking portion 72 for assisting in anchoring the electrical component, in this case the wire harness 32, to the first electrical connector 30. The circuit traces 52 extend outwardly along the rib 70 and are formed in the same manner as pin 60, discussed above and shown in FIG. 5B. Although a thin flat rib 70 is shown, any configuration may be used that is suited to accommodate a plurality of traces 52.

Similarly, the wire harness 32 includes a housing 82 having an internal cavity 84 for receiving the first electrical connector 30. The housing 82 includes at least one terminal 86 for frictionally engaging the first electrical connector 30 and providing an electrical connection between the traces 52 and the wire harness 32. The embodiment of FIG. 5A includes two terminals since there is a separate trace on either side of the first connector 30. That arrangement provides two separate electrical signals, unlike the second connector 40 which only provides one electrical signal. The first electrical connector 30 is preferably the main power supply source for all the components 42,44,46,48 within the vehicle door 18 and the trim panel 12.

As discussed above, the second electrical connector 40 of the trim panel 12 is electrically connected to one of the electrically operated components 42,44,46,48. Accordingly, every circuit trace 52 of the electrical circuit 50 begins at the first electrical connector 30 and travels along the trim panel 12 to the designated electrical component 42,44,46,48. Moreover, one trace 52 may tie into another trace 52 if the traces share the same electrical signal. Hence, the electrical current travels from the vehicle wire harness 32, through the first electrical connector 30 of the trim panel 12, through the electrical circuit 50, through the second electrical connector 40 of the trim panel 12, and finally into the designated electrical component 42,44,46,48.

As appreciated by those skilled in the art, these electrical connectors can be of any suitable design or configuration without deviating from the scope of this invention. Also, although an integrally formed male connector is the preferred embodiment, the invention extends to an integrally formed female connector adapted to be coupled with a male housing.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A vehicle trim panel assembly, comprising:
   a trim panel made of electrically non-conductive material having an interior surface;
   an electrical circuit formed by a plurality of circuit traces made of electrically conductive material integrally deposited upon and adhered to the interior surface of said trim panel; and
   a first electrical connector comprising at least one outwardly projecting pin integrally formed with the interior surface of said trim panel, at least one circuit trace of said plurality of circuit traces extending over at least a portion of the pin,
   wherein said first electrical connector may be connected to an electrical component.

2. The vehicle trim panel assembly according to claim 1, further comprising a second electrical connector comprising at least one outwardly projecting rib integrally formed with the interior surface of said trim panel, at least one circuit trace of said plurality of circuit traces extending outwardly along at least a portion of the rib.

3. The vehicle trim panel assembly according to claim 2, wherein the rib includes a locking portion for securing the electrical component to said second electrical connector.

4. The vehicle trim panel assembly according to claim 2, wherein said second electrical connector is substantially perpendicular to the interior surface of said trim panel.

5. The vehicle trim panel assembly according to claim 2, wherein the electrical component includes a housing having an internal cavity capable of receiving the outwardly projecting rib of said second electrical connector.

6. The vehicle trim panel assembly according to claim 5, wherein the electrical component further includes a terminal engaging at least a portion of the at least one circuit trace extending over at least a portion of the rib, thereby forming an electrical connection between said second electrical connector and the electrical component.

7. The vehicle trim panel assembly according to claim 1, wherein said first electrical connector is substantially perpendicular to the interior surface of said trim panel.

8. The vehicle trim panel assembly according to claim 1, wherein the electrical component includes a housing having an internal cavity capable of receiving the outwardly projecting pin of said first electrical connector.

9. The vehicle trim panel assembly according to claim 8, wherein the electrical component further includes a terminal engaging at least a portion of the at least one circuit trace extending over at least a portion of the pin, thereby forming an electrical connection between said first electrical connector and the electrical component.

10. The vehicle trim panel assembly according to claim 1, wherein the plurality of circuit traces are deposited onto the interior surface of said trim panel by using a thermal spray process.

\* \* \* \* \*